United States Patent [19]
Stoltman

[11] 3,895,563
[45] July 22, 1975

[54] HYDRAULIC SERVOMOTOR

[75] Inventor: Donald D. Stoltman, Henrietta, N.Y.

[73] Assignee: General Motors Corporation, Detroit, Mich.

[22] Filed: Jan. 14, 1974

[21] Appl. No.: 433,010

Related U.S. Application Data

[62] Division of Ser. No. 291,213, Sept. 22, 1972.

[52] U.S. Cl. .................. 91/384; 91/388; 91/461
[51] Int. Cl. ............................................. F15b 9/10
[58] Field of Search ............. 91/388, 384, 307, 309

[56] References Cited
UNITED STATES PATENTS

| | | | |
|---|---|---|---|
| 2,982,258 | 5/1961 | Farkas | 91/384 |
| 3,205,788 | 9/1965 | Limbrick | 91/384 |
| 3,583,285 | 6/1971 | Johnson | 91/388 |
| 3,665,806 | 5/1972 | Heath | 91/388 |

*Primary Examiner*—Paul E. Maslousky
*Attorney, Agent, or Firm*—Paul Fitzpatrick

[57] ABSTRACT

A hydraulic position servo system drives an output to follow a mechanical input over a normal range. An electrically-operated valve provides for output travel beyond the normal range independently of the mechanical input. The servo system includes a primary control valve moved by the mechanical input and output movements and a slave valve controlled by pressure differential generated by the other valves. The primary control valve embodies a pintle laterally shiftable in a cylinder to differentially throttle two orifices to establish a variable control pressure. The slave valve differentially throttles the inputs to a double-acting servo cylinder. Reciprocal jet pumps in the connections to the return line from the slave valve act to energize return flow from the servo cylinder in either direction of movement.

4 Claims, 5 Drawing Figures

PATENTED JUL 22 1975 3,895,563

SHEET 1

HYDRAULIC SERVOMOTOR

This application is a division of my application Ser. No. 291,213 filed Sept. 22, 1972 for Turbine Nozzle Control now U.S. Pat. No. 3,814,537, the disclosure of which is incorporated herein by reference.

My invention is directed to improvements in servomotor systems particularly adapted to control of variable power turbine nozzles in gas-coupled gas turbine engines.

Portions of the disclosure of Ser. No. 291,213 believed immaterial to understanding of the present invention are omitted from this specification in the interest of conciseness. If desired, this material may be ascertained from U.S. Pat. No. 3,814,537.

My invention is directed to providing what I consider to be an improved arrangement of a turbine nozzle servomotor system having features of simplicity, reliability, and flexibility of operation, as well as inexpensive production costs such as to make it highly suitable for use in automotive and other vehicle installations.

The principal objects of my invention are to provide an improved turbine nozzle servomotor for a gas-coupled gas turbine engine; to provide a simple, reliable, and inexpensive servomotor system for a gas turbine nozzle; and to provide an improved hydraulic servomotor system suitable for various purposes.

The nature of my invention and its advantages will be clear to those skilled in the art from the succeeding detailed description of the preferred embodiment of the invention and the accompanying drawings thereof.

Figure 1A:
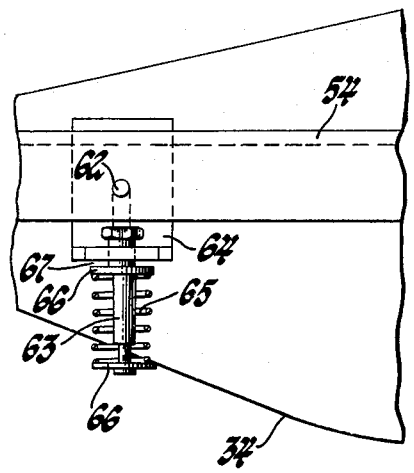
FIG. 1A illustrates a structural detail.
Figure 1:
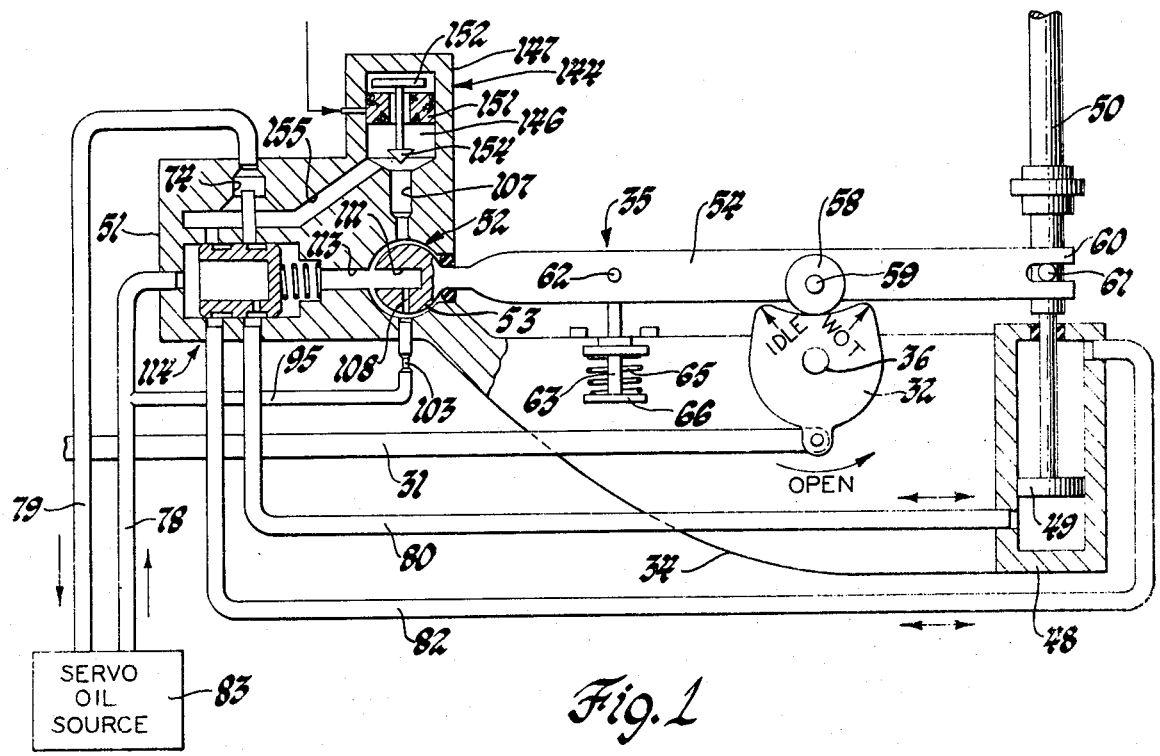
FIG. 1 is a schematic diagram of my servomotor system.

Referring first to FIG. 1, a suitable input to the servomechanism is connected through a link 31 to a cam 32 rotatably mounted on a fixed support 34 by a pivot 36. The cam provides the basic control schedule of the servomotor output for normal steady-state operation. Cam 32 and support 34 are parts of a servo 35. The support 34 includes mounting means to which a double-acting hydraulic motor or power cylinder 48 is fixed. The power cylinder includes a piston 49 which reciprocates a piston rod 50 which is connected to the turbine nozzle to be adjusted (not illustrated).

Figure 2:
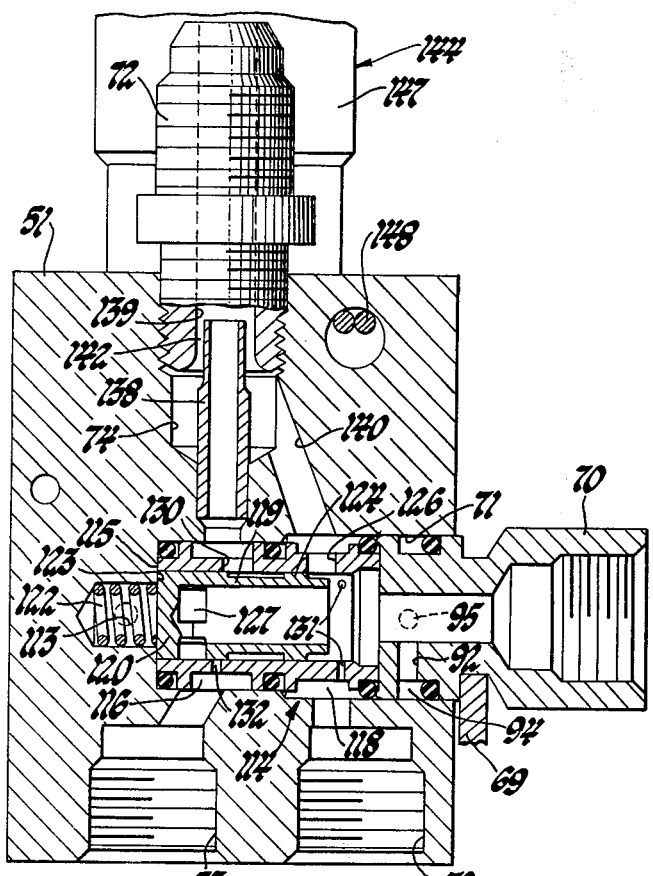
FIG. 2 is a cross sectional view of a valve block.

A valve block 51 is mounted on the opposite end of support 34 from the cylinder 48. This valve block contains the hydraulic valve mechanism which controls flow of fluid to the cylinder 48. The valves include a servo control valve or pilot valve assembly 52. The piston rod 50 is connected to a movable valve pin 53 of valve 52 by a feedback linkage including a lever 54, which also provides the input to the servo system from cam 32. The intermediate portion of lever 54 mounts a cam follower roller 58 on a shaft 59. This roller engages the contoured perimeter of cam 32. The right hand end of lever 54 as illustrated defines a clevis 60, the arms of which straddle a crosspin 61 extending through the piston rod 50. Movement of either cam 32 or piston rod 50 tends to move the lever 54 so as to move the servo valve pin 53, as will be explained below in greater detail. It may be mentioned here, however, that the travel of valve pin 53, which is transverse to the plane of FIG. 2, is very slight, of the order of six or seven thousandths of an inch. The follower 58 is normally held in engagement with cam 32 by action of the power cylinder, so that the fulcrum of the lever is at shaft 59.

However, for certain conditions of operation, the fulcrum shifts to a floating pivot 62. Pivot 62 extends laterally from a post 63 slidable in a hole in a bracket 64 fixed to support 34. A compression spring 65 is bridled between retainers 66 slidable toward each other but held against separation by shoulders on the post 63.

In normal steady-state operation, there is a clearance between the near retainer 66 and the bracket 64, so that spring 65 is entirely ineffective. However, the system may override or supersede cam 32, in which case rod 50 moves upward as illustrated to close this clearance and provide a fulcrum at 62 for lever 54. This provides for the engine acceleration setting of the turbine nozzle.

Under certain conditions, there is further travel of rod 50 accompanied by compression of spring 65.

Normally, movement of the cam 32 in response to movement of the power control 24, or travel of piston rod 50, will shift the control valve 53 within the valve block 51. The normal operation of the servomechanism is to control the cylinder so that valve pin 53 is maintained close to a particular position in its rather limited range of travel so that the cylinder moves the piston rod and thereby the nozzle vanes to follow the commands transmitted from link 31 through cam 32.

Referring also to FIG. 2, the valve block 51 is approximately a rectangular polyhedron. It is bored and tapped and provided with suitable fittings for flow of fluid. A fitting 70 mounted in a bore 71 in the body and retained by a clip 69 provides for connection of a servo oil supply line from a pump. A fitting 72 screwed into the tapped portion of a bore 74 in the valve block provides for connection of the oil return line. Two tapped holes 75 and 76 provide for connection of the fluid lines to the cylinder 48. As illustrated in FIG. 1, these four lines are respectively 78, 79, 80, and 82. The servo oil source 83 illustrated in FIG. 1 is preferably such as to provide a reasonably constant flow of servo oil under sufficient pressure to overcome any resistance to the movement by the turbine nozzle vanes. The servo oil source may, as is clear to those skilled in the art, be the hydraulic power steering system of a vehicle. In this case the turbine nozzle servo system is connected in series with the power steering servo. My servo system permits constant oil flow in all positions of the valve mechanism.

Referring now to the servo valve assembly 52 (FIGS. 3 and 4), the valve pin 53 is mounted in a straight bore 84 extending through the valve block 51. The valve pin is generally of circular cross section, having heads 85 and 86 at the ends and having a land 87 near the head 86. The head 85 is substantially the same diameter as the bore 84 but sufficiently smaller to allow the valve pin to pivot about this head as a center of rotation. A pivot pin 88 disposed in a bore 89 intersecting bore 84 at a right angle provides a fulcrum for the movement of valve pin 53 to effect its controlling action. The head 86 is disposed outside the valve block and includes a portion which fits within a bore in the lever 54, the lever being retained by a snap ring 90 mounted in a groove in the head 86. Fluid under pressure is contained within the bore 84 by O-rings 91 bearing against the heads of pin 53.

When oil under pressure is supplied to the servo valve 52 through the inlet fitting 70, a hole 92 through the wall of this fitting admits oil into an annulus 94 within bore 71, sealed by an O-ring. A drilled passage 95 (see also FIG. 4) conducts this oil to a stepped bore 96 within the valve block which is perpendicular to and intersects the bore 84 at valve pin land 87. The lower end of bore 96 is closed by a plug 102. A calibrated orifice 103 (see also FIG. 1) is seated against a step in the bore 96. Thus flow from the source 83 to valve 52 creates a pressure loss at the orifice 103.

Figure 3:
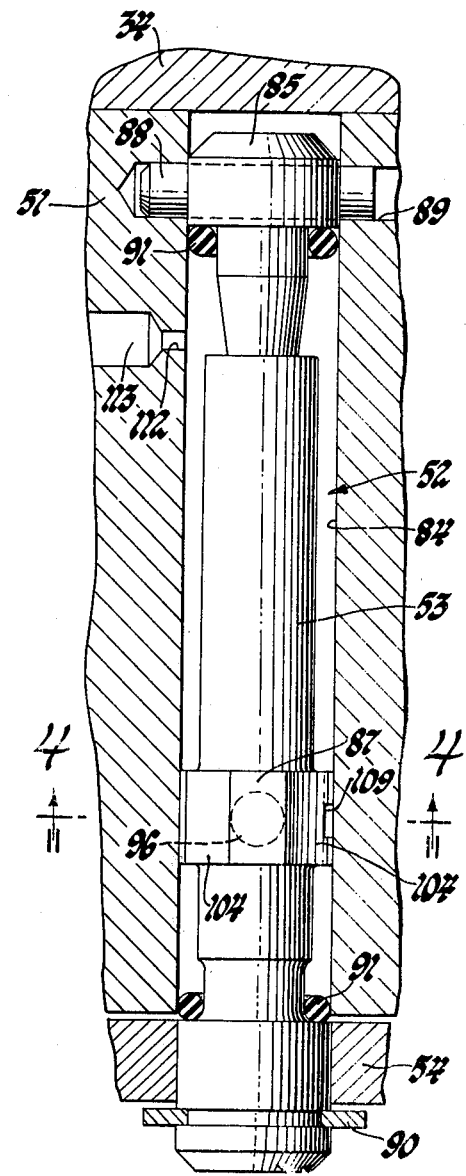
FIG. 3 is a sectional view of a servo control valve.
Figure 4:
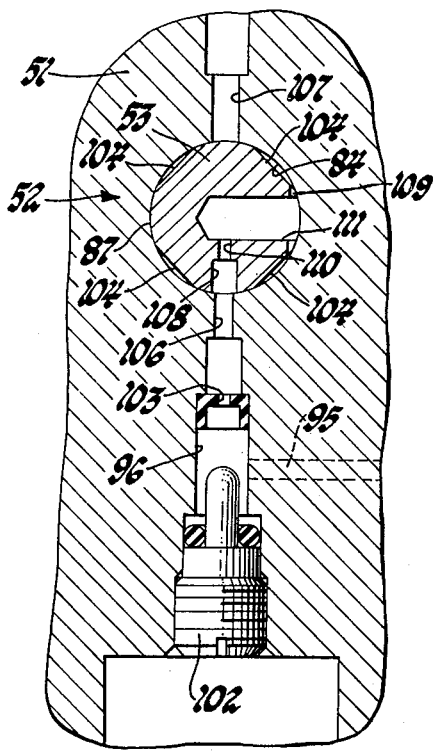
FIG. 4 is a partial sectional view of the valve mechanism taken on the plane indicated by the line 4—4 in FIG. 3.

The land 87 on valve pin 53 has four flats 104 which leave between them cylindrical surfaces at the top, bottom, and sides of the pin as is clearly shown in FIG. 4. Pin 85 is shown about four times size in FIGS. 3 and 4. The land 87 has about three thousandths inch radial clearance in bore 84. Thus, the land 87 can move down against the fluid inlet 106 from bore 96 or upwardly against an outlet bore 107 which is coaxial with bore 96. The valve pin 53 has a passage 108 aligned with inlet 106 extending into the valve pin, this passage defining a second orifice 110. Flow through orifice 110 may be discharged through a relatively large lateral passage 111 in the valve pin which intersects passage 108 and discharges through a slot 109 into bore 84. Therefore, flow from 106 to 107 is throttled primarily at the inlet 106 as the valve pin moves downward in FIG. 4 or primarily at the outlet 107 as the valve pin moves upward in FIG. 4, and the two orifices or throttling ports are alternatively or reversely varied. The pressure between the two ports is thus varied by movement of the valve pin. This pressure, which may be called the control pressure, fills the bore 84 around the pin 53. The control pressure is a function of the drop through orifice 103 and, in some positions of pin 53, also orifice 110. The control pressure is communicated from bore 84 through a damping orifice 112 and a bored passage 113 to the slave valve assembly 114 to be described.

It may be noted that O-ring 91 is believed to assist in centering valve pin 53; that is contributing some bias away from its limit positions where land 87 engages the surface of bore 84.

Valve 52 is the subject matter of my companion application Ser. No. 433,009 filed Jan. 14, 1974.

Referring specifically to FIG. 2 for the slave valve assembly 114, this includes a valve sleeve 115 in the bore 71 retained by the fitting 70. O-rings and flanges on the valve sleeve bound two fluid annuli 116 and 118 between the sleeve and the wall of bore 71 which are in direct communication with the cylinder ports 75 and 76 respectively. A hollow valve spool 119 closed at its inner end by a head 120 is reciprocable in sleeve 115. Servo fluid under full pressure from inlet 70 bears against the right hand face of valve spool 119 as illustrated in FIG. 2. The control pressure transmitted through passage 113 into the closed end of bore 71 biases the spool in the other direction, as also does a compression spring 122 contained in the end of bore 71. The position of valve spool 119 is thus determined by the difference between the servo oil pressure and the control pressure and the characteristic of spring 122. Normally, the valve floats to the right of the extreme left position illustrated, clear of the shoulder 123. Assuming that the valve is floating near the center of its range of operation, a land 124 on the valve spool throttles radial ports 126 through the sleeve which communicate with the annulus 118. A ring of ports 127 through the spool communicates through ports 130 in the sleeve with the annulus 116. These ports are varied inversely in area by reciprocating movement of the valve spool.

The sleeve defines small ports 131 and 132 which normally maintain open communication between the inlet and the two lines to the cylinder 48. These minimize the abruptness of the throttling if the valve spool approaches the limits of its travel. Ports 131 are blocked when spool 119 engages fitting 70 at one end of its range of travel and ports 132 are closed as the spool approaches shoulder 123.

Annulus 116 and port 75 are in open communication with a jet or nozzle 138 which is concentric with bore 74 and enters the internal passage 139 in return fitting 72. Annulus 118 and port 76 are connected by a passage 140 with the bore 74 and thus with an annular nozzle 142 defined between the nozzle 138 and the bore 139. This structure constitutes what I call a reciprocal jet pump, the point being that flow through either nozzle 138 or nozzle 142 tends to energize the flow through the other nozzle. Thus, when spool 119 moves off center to direct the major portion of the flow to either annulus, the drop through the nozzle connected to that annulus increases the pressure in the corresponding cylinder line. The pumping action of the jet pump reduces the pressure in the other cylinder line. The resulting pressure difference displaces the piston 49.

The remaining item of consequence associated with the valve block is a solenoid valve 144 which may be of a well-known type in which current flowing through a coil generates a magnetic field which pulls on an armature and thus urges a movable valve member against its seat. This structure is illustrated schematically in FIG. 1 and in outline in FIG. 2. The passage 107 from the servo valve enters a chamber 146 within a solenoid valve housing 147 which is held against the upper surface of the valve block by a retainer clip 148 and a screw (not illustrated). The end of the retainer clip which is not held by the screw is lodged in an opening in the block 51. Current supplied to a solenoid 151 draws on armature 152 to press movable valve poppet 154 against the seat at the outlet of passage 107. Chamber 146 communicates through a passage 155 with the bore 74.

Preferably, the valve 144 is operated on a form of duty cycle control, which means that current is supplied to the solenoid in periodic pulses of constant amplitude and variable duration. The resistance to flow through the valve is a function of the duration of the current pulses. If the duty cycle is zero, there is no force tending to close valve 144 and, as the duty cycle increases, the back pressure or resistance to flow due to the valve increases. At the limit, 100% duty cycle, the valve completely blocks flow through passage 107 and therefore prevents any pressure drop through orifice 103 and valve 52.

OPERATION OF THE SERVOMOTOR SYSTEM

The operation of the system may be clear to those skilled in the relevant arts from the above description, but it seems desirable to present the mode of operation in a coherent manner now that the structure has been described. Referring to FIG. 1, first let us assume that the vane angle cam 32 is rotated clockwise from its position shown in FIG. 1 so that the follower 58 is riding near the left (idle) end of the cam surface, which is of greater radius than the position in which the cam is shown.

Also assume that solenoid valve 144 is open. Servo fluid is supplied to inlet fitting 70 from the source 83. Servo oil thus flows continuously through orifice 103 and servo valve 52 to return line 79, which we may assume to be at substantially zero gauge pressure. Leaving aside for the moment the effect of valve 52, the pressure drop through orifice 103 will establish a control pressure biasing the slave valve spool 119 which is insufficient to move the spool to its center or neutral position. The valve will remain biased toward a position in which the major part of the servo fluid is supplied to port 76 and through line 82 to the cylinder, acting to close the turbine nozzle vanes. However, as the piston rod 50 moves downwardly as illustrated to close the vanes, the lever 54 rocks about its fulcrum at 59 on the cam, thus moving valve pin 53 upward as illustrated to throttle the outlet from valve 52 into passage 107. This causes a reduction of flow through orifice 103 and an increase in the control pressure, acting on valve spool 119 to reduce the pull exerted by piston 49. If the piston rod reverses slightly, the flow through valve 52 increases and the control pressure correspondingly drops. The piston therefore holds the follower 59 in engagement with the cam and valve pin 53 close to the outlet 107, maintaining a balanced condition in the hydraulic system. Whatever force is required to hold the piston in this position will be exerted by the power cylinder.

Now, if the operator acts to slowly increase the engine power level, cam 32 is rotated counterclockwise and piston 49 retracts piston rod 50, increasing the turbine vane angle. If the cam is slowly rotated past the position illustrated in FIG. 2, the follower rises and the corresponding follow-up action causes the turbine vane angle to decrease. The follow-up action is based upon the throttling of flow through orifice 103 by the servo valve 52 which maintains the desired or necessary pressure differential in cylinder 48.

At this time, as at all other times, the substantial flow of fluid through the system proceeds through the nozzles 138 and 142 and into the return line 79. Whatever pressure differential is required in cylinder 48 to hold the vanes in position will be provided by movement of the slave valve spool to one side or the other of its neutral position in response to the changes in the control pressure relative to the servo fluid inlet pressure which are effected by the servo control valve 52.

Now let us assume that the power control 24 is moved quickly to call for higher power operation of the engine. In this case, the cam 32 is moved, but the normal follow-up action is overridden for the time being by an acceleration signal. There is an input which, in the particular system, as calibrated, causes a duty cycle generator (not illustrated) which energizes solenoid 151 to operate on a 70% cycle. This results in substantial opposition by the solenoid valve 144 to flow through orifice 103 and servo valve 52. The pressure drop through valve 154, which is downstream of the line 113 to the slave valve assembly, increases the control pressure causing the slave valve piston to move to the right as illustrated in FIG. 3, and to supply the predominant pressure through line 80 to the cylinder to cause the piston rod 50 to move to decrease vane angle.

As rod 50 moves upwardly as viewed in FIG. 2, the follower 59 is lifted from cam 32 and lever 54 swings about the servo valve pin 53 as a temporary pivot. This action raises the pivot 62 until the clearance at 67 between the bracket 64 and abutment 66 of the bridled spring is closed. The bridled spring is not further compressed by this action, and the pivot pin 62 now provides a fulcrum for the feedback lever 54. Thus, continued movement upward of rod 50 as illustrated moves valve pin 53 downward as illustrated in FIG. 5 to cause it to bear against the inlet 106 to the servo valve. Flow from the inlet to the slave valve is now throttled by orifice 103 and orifice 110 in series. Orifice 110 is smaller than orifice 103. This results in a greater pressure drop and a lowering of the control pressure so that the servo system finds an equilibrium at the position where valve pin 53 is near the downward limit of its movement of travel and the clearance 67 at the bridled spring remains closed. With the valve pin 53 seated tightly against the inlet 106, the pressure drop is sufficiently great to cause the slave valve to operate to pull the rod slightly into the cylinder. This action, of course, relieves the force biasing pin 53 against the incoming fluid and tends to allow some leakage around the pin, by-passing the orifice 110. The vanes are stabilized at a fixed position wider open than the normal operating position controlled by cam 32 until the acceleration signal is terminated and solenoid valve 146 reopens, restoring the control to the mode previously described in command of cam 32. The rod 50 is then retracted to bring the roller into contact with the cam and the nozzle angle and nozzle opening will be as called for by the normal schedule.

Under some conditions, a signal is supplied to the duty cycle generator to create a 100% duty cycle on the solenoid valve 144. At this energization of the valve, the valve is closed completely and, since there is no flow through the orifice 103 and the orifices defined by the servo control valve, the control pressure supplied to the slave valve will be equal to the servo fluid inlet pressure. In this condition the slave valve moves fully to the right as illustrated in FIG. 2 to provide maximum force to the piston to push it upward until a stop limits further travel of the piston. This movement will be accomplished with the feedback arm 54 swinging about the valve pin 53 as a fulcrum, the bridled spring 65 being compressed. The valve pin 53 is thus held in position against the inlet 106 but, since there is no flow through the valve to return, the pressure delivered to the slave valve remains at full pressure level. When the condition responded to is terminated, the solenoid valve 147 reopens to restore normal control to the device.

I believe it will be apparent to those skilled in the art from the foregoing that I have devised a novel, flexible, and very simple means for accomplishing the desired results in servomotor control.

The detailed description of the preferred embodiment of the invention for the purpose of explaining the principles thereof is not to be considered as limiting or restricting the invention, since many modifications may be made by the exercise of skill in the art.

I claim:

1. A power servo system comprising, in combination, a double-acting expansible chamber motor having a movable output member; a movable input member; a servo control valve; a feedback linkage interconnecting the input member, the output member, and the servo control valve; a source of servo fluid under pressure; a fluid return line; two motor lines for conducting servo fluid to and from the motor; a slave valve connecting the motor lines reversibly to the fluid source, the slave valve being biased in one direction by source pressure and in the other direction by a control pressure; the servo control valve including, in series as recited, a connection to the source, a first variable restriction means, a connection to supply control pressure to the slave valve, a second variable restriction means, and a connection to the return line, the said first and second veriable restriction means being varied reversely by movement of the feedback linkage; and fixed throttling means disposed between the source and the servo control valve.

2. A power servo system comprising, in combination, a double-acting expansible chamber motor having a movable output member; a movable input member; a servo control valve; a feedback linkage interconnecting the input member, the output member, and the servo control valve; a source of servo fluid under pressure; a fluid return line; two motor lines for conducting servo fluid to and from the motor; reciprocal jet pump means connecting the motor lines to the return line; a slave valve connecting the motor lines reversibly to the fluid source, the slave valve being biased in one direction by source pressure and in the other direction by a control pressure; the servo control valve including, in series as recited, a connection to the source, a first variable restriction means, a connection to supply control pressure to the slave valve, a second variable restriction means, and a connection to the return line, the said first and second veriable restriction means being varied reversely by movement of the the feedback linkage; and fixed throttling means disposed between the source and the servo control valve.

3. A power servo system comprising, in combination, a double-acting expansible chamber motor having a movable output member; a movable input member; a servo control valve; a feedback linkage interconnecting the input member, the output member, and the servo control valve; a source of servo fluid under pressure; a fluid return line; two motor lines for conducting servo fluid to and from the motor; a slave valve connecting the motor lines reversibly to the fluid source, the slave valve being biased in one direction by source pressure and in the other direction by a control pressure; the servo control valve including, in series as recited, a connection to the source, a first variable restriction means, a connection to supply control pressure to the slave valve, a second variable restriction means and a connection to the return line, the said first and second veriable restriction means being varied reversely by movement of the feedback linkage; fixed throttling means disposed between the source and the servo control valve, and variable throttling means interposed between the servo control valve and the return line.

4. A power servo system comprising, in combination, a double-acting expansible chamber motor having a movable output member; a movable input member; a servo control valve; a feedback linkage interconnecting the input member, the output member, and the servo control valve; a source of servo fluid under pressure; a fluid return line; two motor lines for conducting servo fluid to and from the motor; reciprocal jet pump means connecting the motor lines to the return line; a slave valve connecting the motor lines reversibly to the fluid source, the slave valve being biased in one direction by source pressure and in the other direction by a control pressure; the servo control valve including, in series as recited, a connection to the source, a first variable restriction means, a connection to supply control pressure to the slave valve, a second variable restriction means, and a connection to the return line, the said first and second variable restriction means being varied reversely by movement of the feedback linkage; fixed throttling means disposed between the source and the servo control valve, and variable throttling means interposed between the servo control valve and the return line.

* * * * *